United States Patent [19]
Drew et al.

[11] Patent Number: 5,943,983
[45] Date of Patent: Aug. 31, 1999

[54] NON-HUMAN PRIMATE RESEARCH SUPPORT TILT TABLE

[75] Inventors: Guy A. Drew, Brownsville; Russell C. Woods, San Antonio; Karen Lott, Marion; Bernard Humes, San Antonio, all of Tex.; Steven C. Koenig, Floyds Knobs, Ind.

[73] Assignee: The United States of America as represented by the Secretary of the Air Force, Washington, D.C.

[21] Appl. No.: 08/918,886

[22] Filed: Aug. 4, 1997

Related U.S. Application Data

[60] Provisional application No. 60/023,483, Aug. 15, 1996.

[51] Int. Cl.⁶ .................................................. A01K 13/00
[52] U.S. Cl. .............................................................. 119/722
[58] Field of Search ................................... 119/722, 723, 119/724

[56] References Cited

U.S. PATENT DOCUMENTS

| | | | |
|---|---|---|---|
| 4,184,451 | 1/1980 | Carlin ....................................... | 119/722 |
| 4,282,828 | 8/1981 | Johnson ................................... | 119/722 |
| 4,303,638 | 12/1981 | Senussi .................................... | 119/722 |
| 4,459,941 | 7/1984 | Moffatt .................................... | 119/722 |
| 4,911,106 | 3/1990 | Goodwin .................................. | 119/722 |
| 4,934,320 | 6/1990 | Cresap, III .............................. | 119/722 |
| 5,162,038 | 11/1992 | Wilker ..................................... | 119/722 |
| 5,488,926 | 2/1996 | Hunt ........................................ | 119/722 |

*Primary Examiner*—Thomas Price
*Attorney, Agent, or Firm*—Tony Y. Cole; Bobby D. Scearce; Thomas L. Kundert

[57] ABSTRACT

A tilting apparatus for supporting and restraining a non-human primate animal while conducting research. The tilting apparatus is provided with a table for supporting the animal reclining face down thereon. The table is supported by support means for rotation about a first axis between a horizontal position and a head-down position and about a second axis between the head-down position and a head-up position. Locking means are provided for releasably locking the table in a selected horizontal, head-down or head-up positions. Suitable restraining means are provided which are intersecurable between the animal and the table and function to support and restrain the animal. The animal, while remaining restrained to the tilting apparatus, has free range of motion to feed itself from a water and feeding station. The water and feeding station is supported by an accessory pole. A waste collection system is provided which is connected to the table and which functions for collecting animal waste. A biosensor protective shield is supported by the accessory pole and prevents the animal from accessing chronically-implanted biosensors and instrumentation.

25 Claims, 8 Drawing Sheets

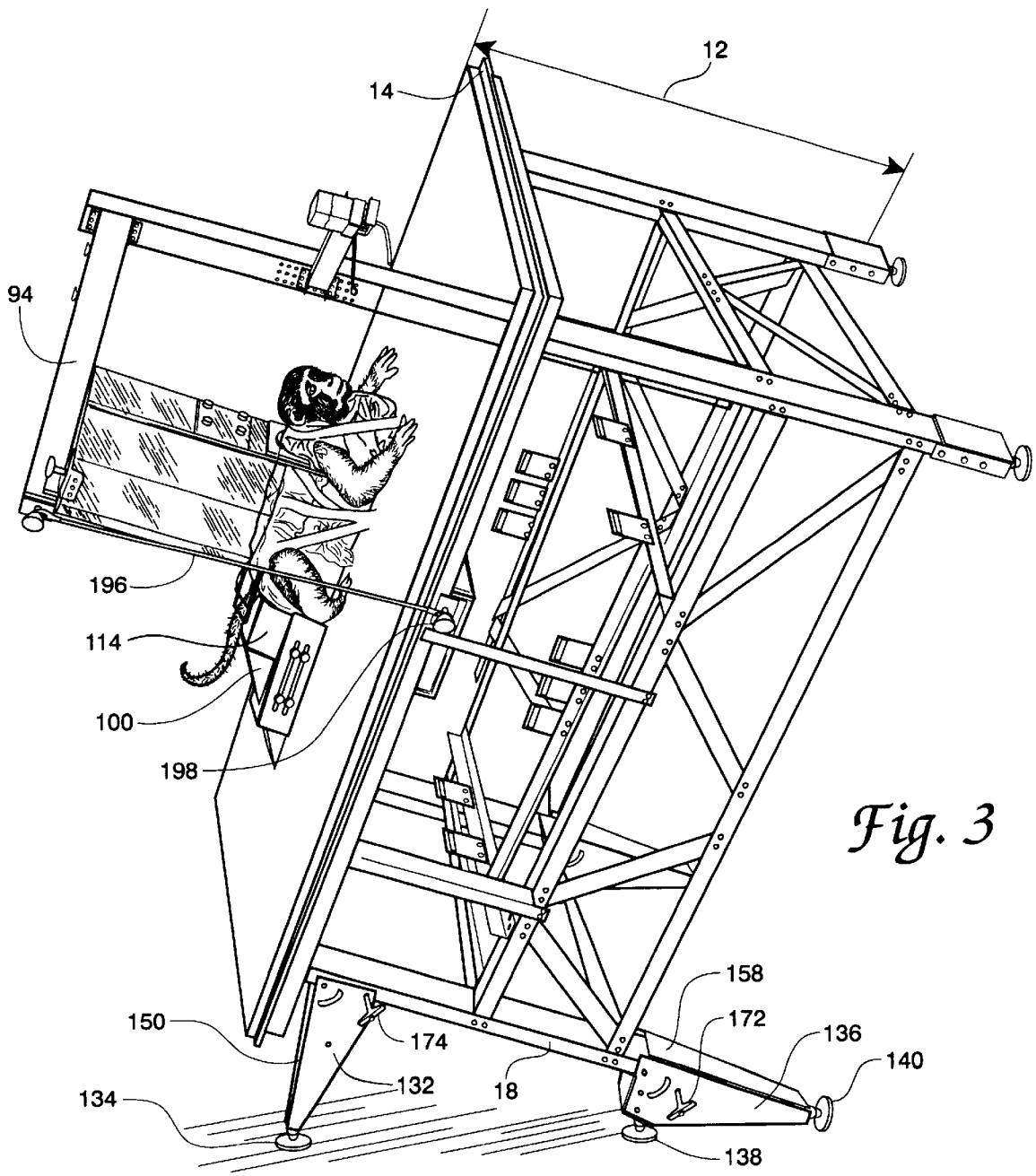

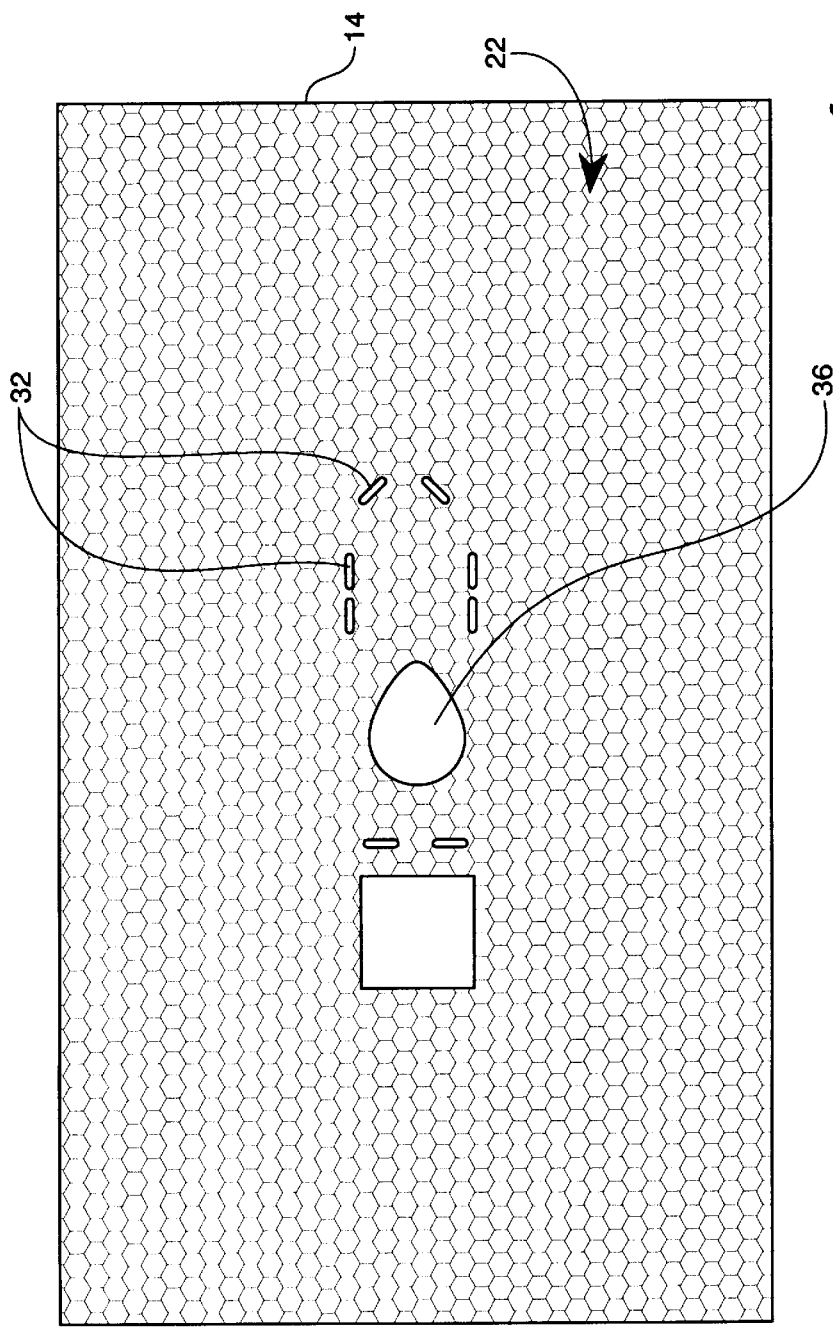

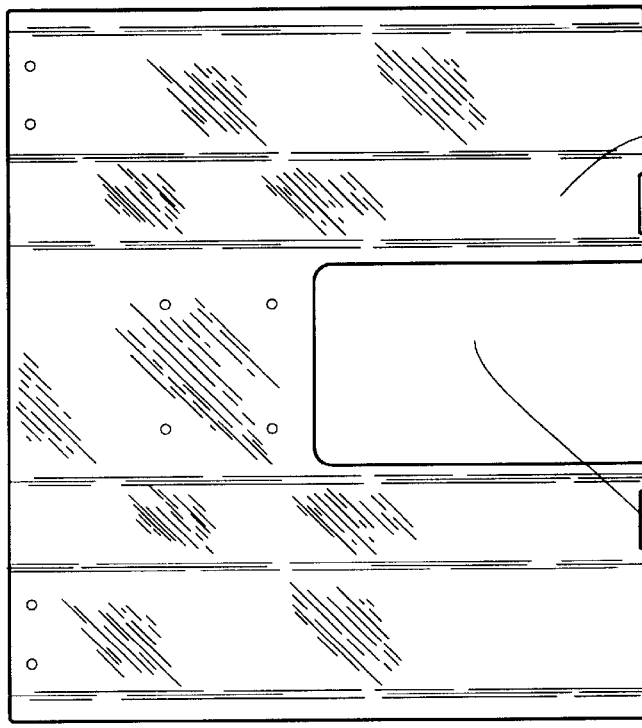
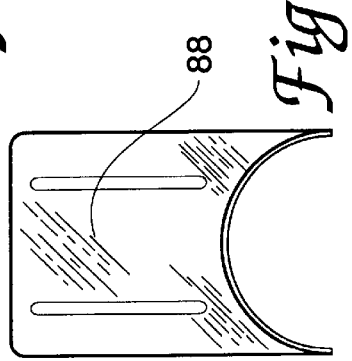
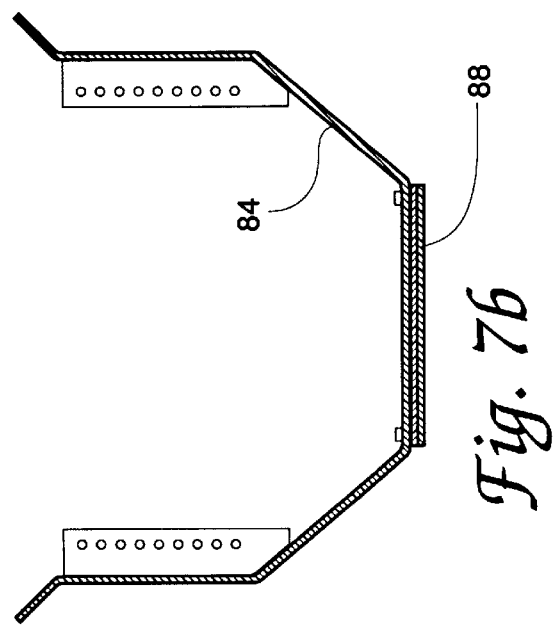
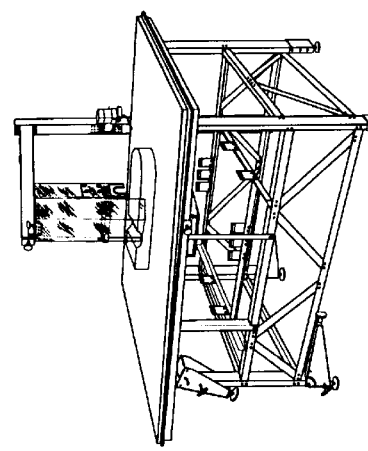

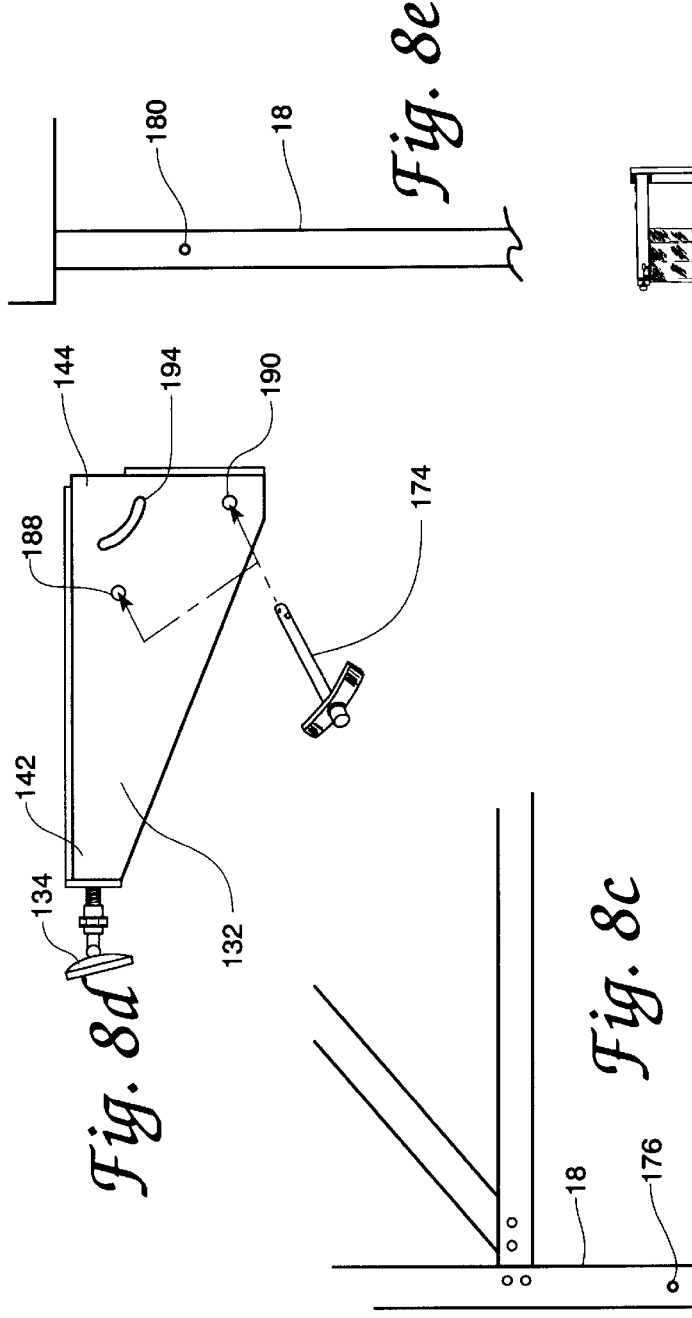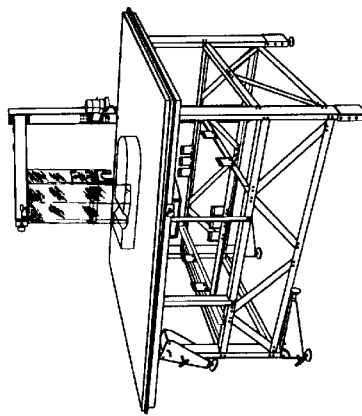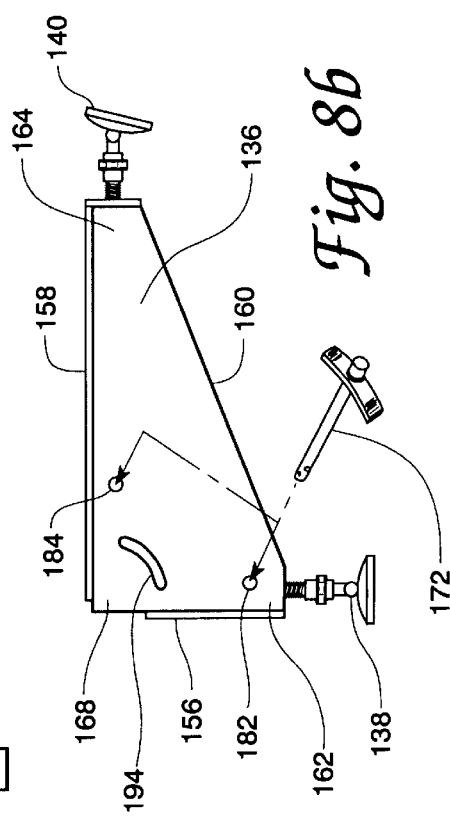

NON-HUMAN PRIMATE RESEARCH SUPPORT TILT TABLE

This application claims benefits from the filing of provisional application No. 60/023,483 filed on Aug. 15, 1996.

BACKGROUND OF THE INVENTION

The present invention relates generally to a tilting apparatus and, in a preferred embodiment thereof, more particularly provides a uniquely constructed and operative tilt table for use in animal research studies involving non-human primates, such as rhesus monkeys.

The use of head-down tilt as a ground-based surrogate to determine physiological effects of microgravity is well known in scientific literature. (Bloomqvist C G, Stone H L. Cardiovascular Responses to Gravitational Stress. In: Shepherd J T, Abboud F M. eds. Handbook of Physiology: The Cardiovascular System. Bethesda: Am. Physiol. Soc. 1983: 1025–63, Sect. 2, Vol. 3, Chapt. 28; Kakurin L L, Lobachik V I, Mikhailov V M, Senkevich Yu A. Antiorthostatic Hypokinesia as a Method of Weightlessness Simulation, Aviat. Space Environ. Med., 47:1083–6). It is known to have tables or chairs for restraining research subjects during such tilt studies.

U.S. Pat. No. 4,890,579 to Oloff, describes an apparatus for rotating immobilized non-human primate animal test subjects about one or more axes to simulate weightlessness during micro-gravity research studies. The apparatus includes a frame, a subframe rotatably attached to the frame and a carrier for a primate restraint system rotatably attached to the subframe. Two motors, controlled by a programmable controller, individually rotate the subframe and the carrier according to a preselected sequence. Animal test subjects are immobilized by means of a primate restraint system, such as that described in U.S. Pat. No. 4,120,266 to Oloff, et al. The Oloff, et al. restraint system uses a combination of clamps and straps to secure the test animal to padded supports. Unfortunately, the Oloff, et al. restraint system limits the test animal's range of motion, impairs the animal's ability to maintain its natural habits, and may result in physiological stressors to the animal, such as adrenergic responses, which may detrimentally impact test results. During long-term studies, the animal must be sedated. Moreover, the animal is subject to muscle atrophy and bed sores during long-term studies. In addition, because of its complex, mechanical, motor-driven design, the Oloff rotating apparatus is difficult to use and expensive to manufacture.

It is therefore a principal object of the present invention to provide a tilting apparatus for adequately supporting and restraining a non-human primate animal during tilt studies such that the animal, while remaining restrained to the tilting apparatus, has a free range of motion of its head and limbs so that the animal may feed itself and so that the animal is at reduced risk for bed sores, muscle atrophy and physiological stressors during long-term studies.

It is a further object of the invention to provide a simple, static tilt table design.

A feature of the present invention is that it provides means for the animal to feed itself and waste collection means.

A further feature of the present invention is that it provides convenient access to the animal test subject.

An advantage of the present invention is that it provides a tilting apparatus which is easily rotatable about horizontal axes and quickly movable between horizontal, head-down tilt and head-up tilt positions.

These, and other objects, features and advantages of the present invention will become apparent as the detailed description of a preferred embodiment thereof proceeds.

SUMMARY OF THE INVENTION

In carrying out principles of the present invention, in accordance with a preferred embodiment thereof, a tilting apparatus is provided which has a table for supporting a non-human primate animal reclining face down thereon. The table is supported by support means for rotation about a first axis between a horizontal position and a head-down position and about a second axis between the head-down position and a head-up position. Locking means are provided for releasably locking the table in selected horizontal, head-down or head-up positions. Suitable restraining means are provided which are intersecurable between the animal and the table and function to support and restrain the animal. The animal, while remaining restrained to the tilting apparatus, has free range of motion to feed itself from a water and feeding station. The water and feeding station is supported by an accessory pole. A waste collection system is provided which is connected to the table and which functions for collecting animal waste. A biosensor protective shield is supported by the accessory pole and prevents the animal from accessing chronically-implanted biosensors and instrumentation.

DESCRIPTION OF THE DRAWINGS

The present invention will be more clearly understood from a reading of the following detailed description in conjunction with the accompanying drawings wherein:

FIG. 3 is a side view of the tilting apparatus showing the animal restrained facedown thereon in a head-up position.

FIG. 4a is a perspective view of a table of the invention and FIG. 4b shows a layer of bedding overlying the table of FIG. 4a.

FIG. 7a is a perspective view of a protective shield which fits around the front and sides of the animal's body as positioned on the table; FIG. 7b is a top view of the shield; FIG. 7c is a front view of the shield; FIG. 7d show a side panel for the shield allowing height adjustment according to animal size.

FIGS. 8a–e show an exploded view of uptight support members and rear support members, which provide means for supporting the table for rotation about horizontal axes between horizontal, head-down and head-up positions. FIG. 8a is a perspective view of a table of the invention; FIG. 8b is a rear leg support for the FIG. 8a table; FIG. 8c shows a rear leg structure for the FIG. 8a table; FIG. 8d shows an upright support structure for the FIG. 8a table; and FIG. 8e shows another rear leg structure view for the FIG. 8a table.

DETAILED DESCRIPTION OF THE INVENTION

Figure 1:
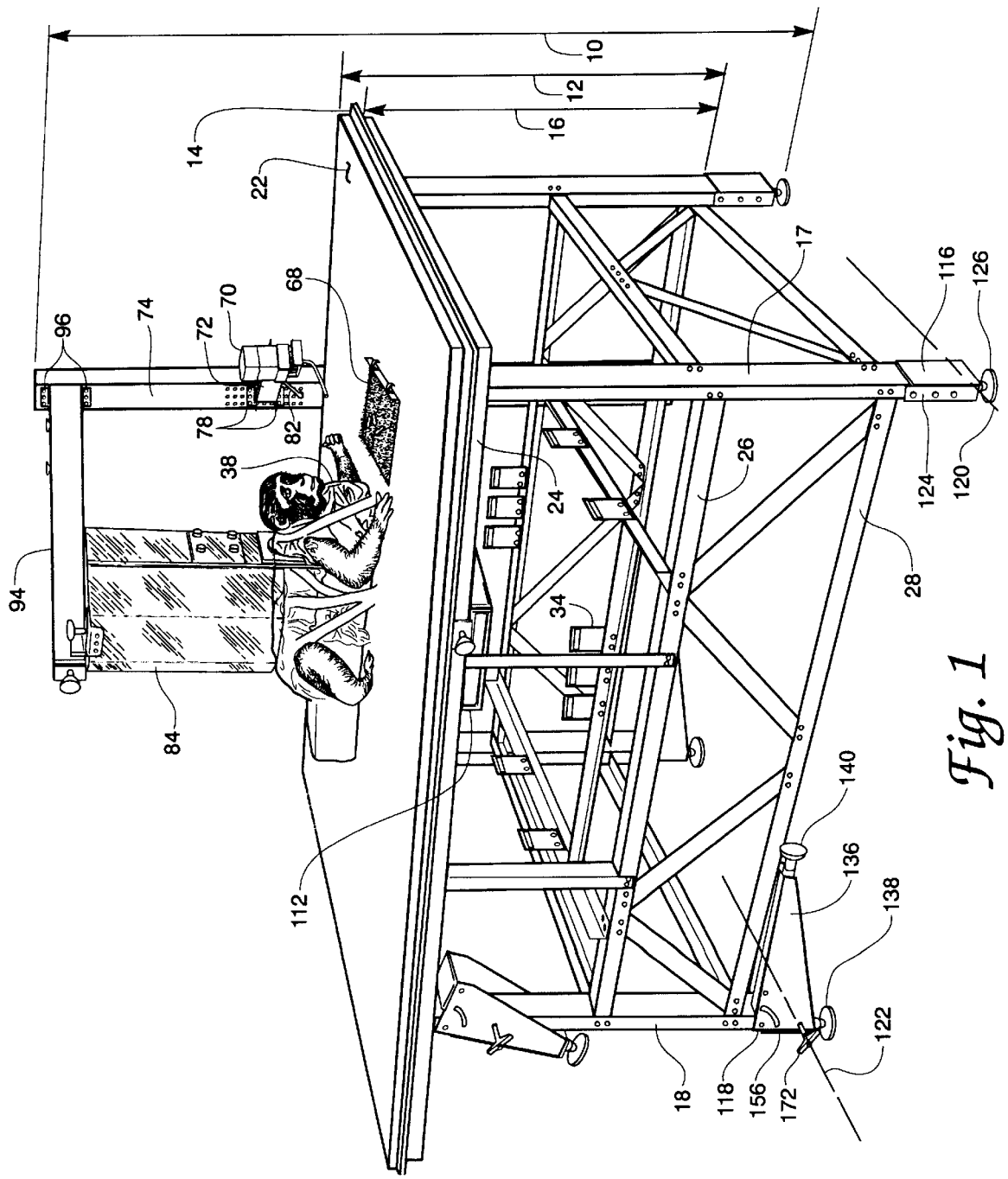
FIG. 1 is a side view of a tilting apparatus which embodies principles of the present invention showing a non-human primate animal restrained face-down thereon in a horizontal position.
Figure 2:
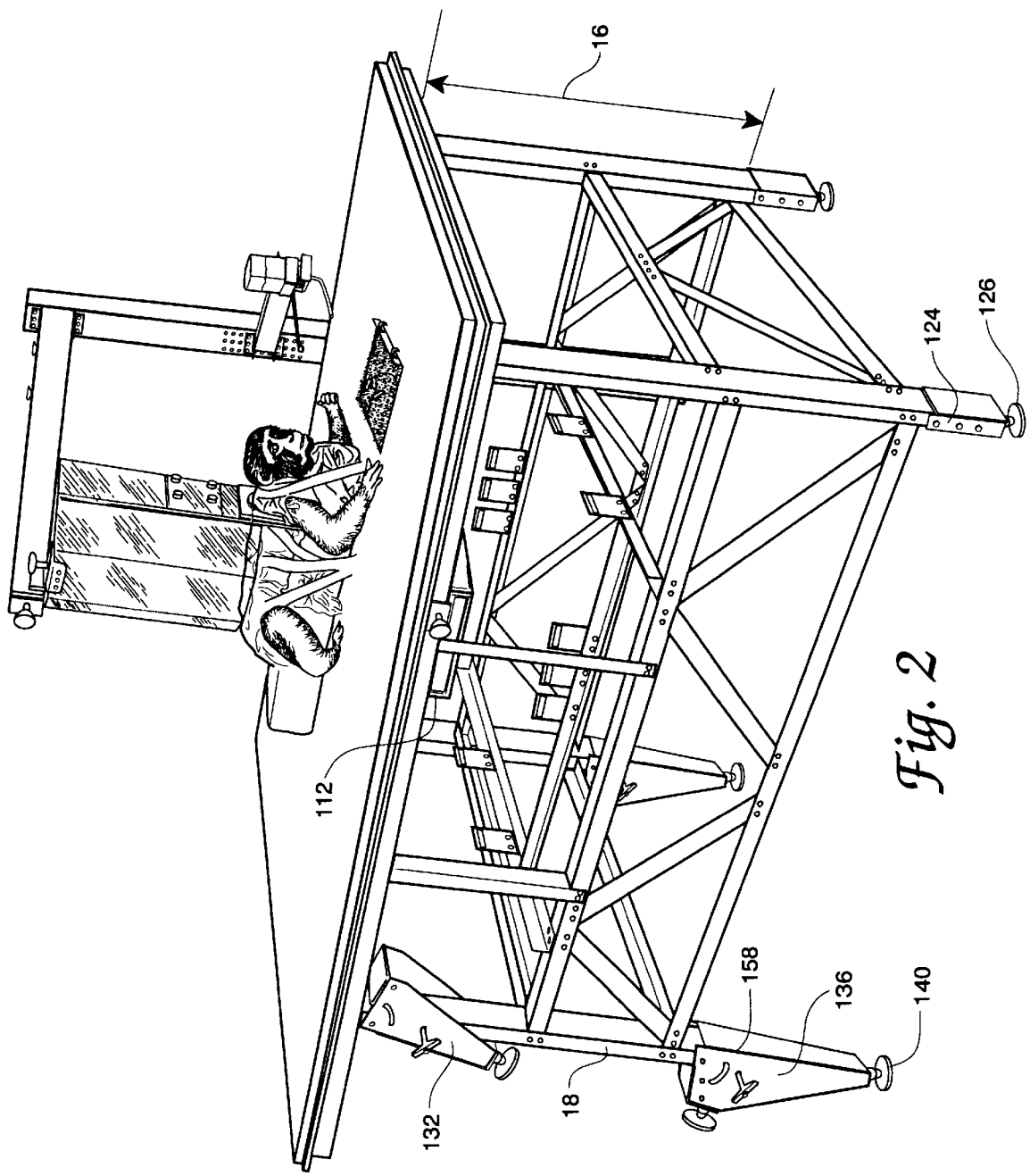
FIG. 2 is a side view of the tilting apparatus showing the animal restrained facedown thereon in a head-down position.

Illustrated in FIG. 1 is a tilting apparatus 10 which embodies principles of the present invention and, in a unique manner subsequently described, is utilized during research to support and restrain a non-human primate animal test subject in horizontal head-down and head-up positions, as depicted in FIG. 1, FIG. 2, and FIG. 3. As shown in FIG. 1, in the horizontal position, the animal's head is generally disposed in a horizontal plane. The animal's head is tilted below the horizontal plane in the head-down position, as illustrated in FIG. 2, and above the horizontal plane in the head-up position, as illustrated in FIG. 3.

As shown in FIGS. 1–3, 4a and 4b, the tilting apparatus includes a table 12 for supporting a reclining animal. Table 12 comprises a table top 14 supported by a frame 16. Table top 14 is sized to receive the animal in a face-down, forwardly extending position toward the front end of frame 16. A layer of bedding 22, consisting of a high-grade, closed-cell egg crate type foam, overlies table top 14. Frame 16 consists of upper members 24, central members 26, and lower members 28, which extend around the circumference of table top 14, connecting members 30, which extend between members 24, 26 and 28 to provide further stability and strength, and front legs 17 and rear legs 18. A plurality of spaced-apart holes 32 are cut out of table top 14 and bedding 22. A plurality of adjustable brackets 34 are located on the central members 26 of the frame. Spaced apart holes 32 and brackets 34 provide means for restraining the animal to table 12. An opening 36 is cut out of table top 14 and bedding 22 to provide means for animal waste drainage and access to a waste collection system.

Figure 5A:
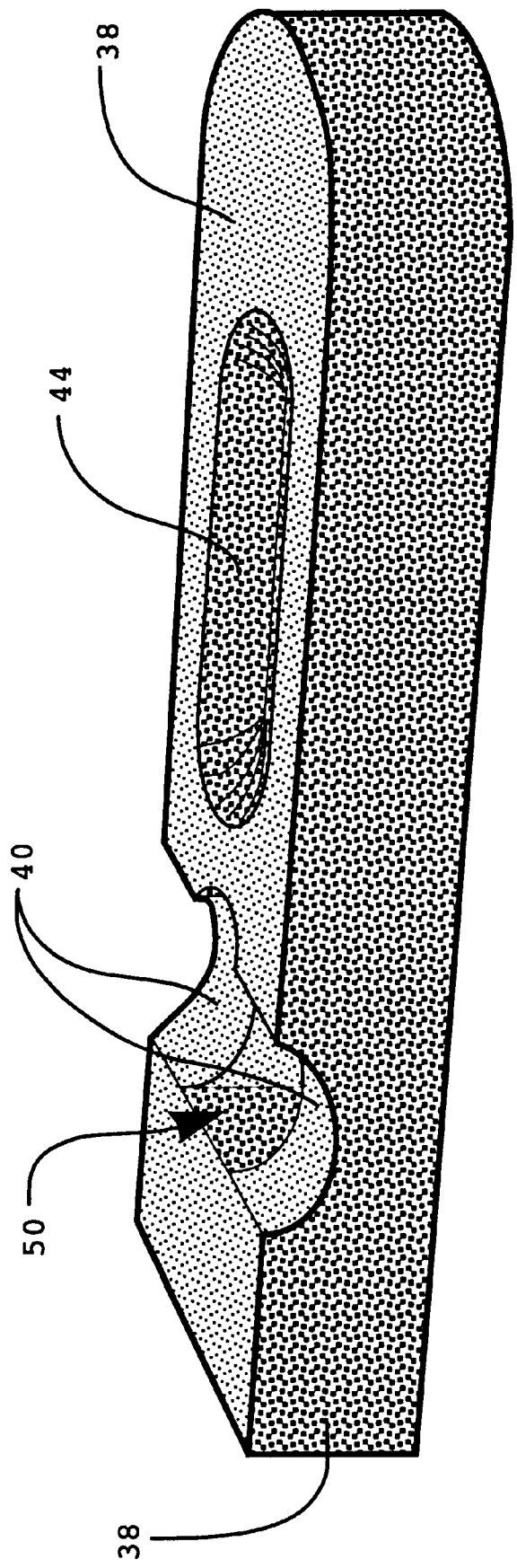
FIG. 5a is a perspective view of padding which overlies the table and provides adjustable support for the animal.
Figure 5B:
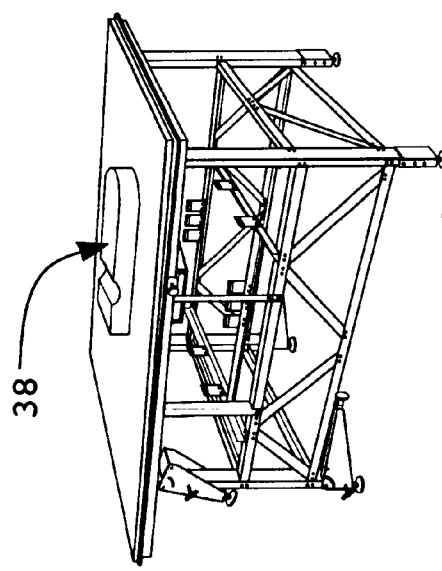
FIG. 5b shows the padding positioned on the table.

As shown in FIG. 1, padding 38 overlying table top 14 and bedding 22 provides adjustable support for the animal and is contoured to correspond with the animal's body. As best illustrated in FIGS. 5a and 5b, two depressed areas 40 adjacent to the rear section of padding 38 provide support for the animal's legs, which aids in the animal's comfort while allowing free movement of the hip joints. Depressed area 44 located in the central portion of padding 38 is contoured to accommodate the animal's abdomen and chest and to prevent discomfort. The front section of padding 38 is rounded, promoting full range of motion of the animal's arms and head, enabling the animal to feed itself A waste drainage opening 50 is cut through padding 38 to provide access to a waste collection system.

Figure 6:
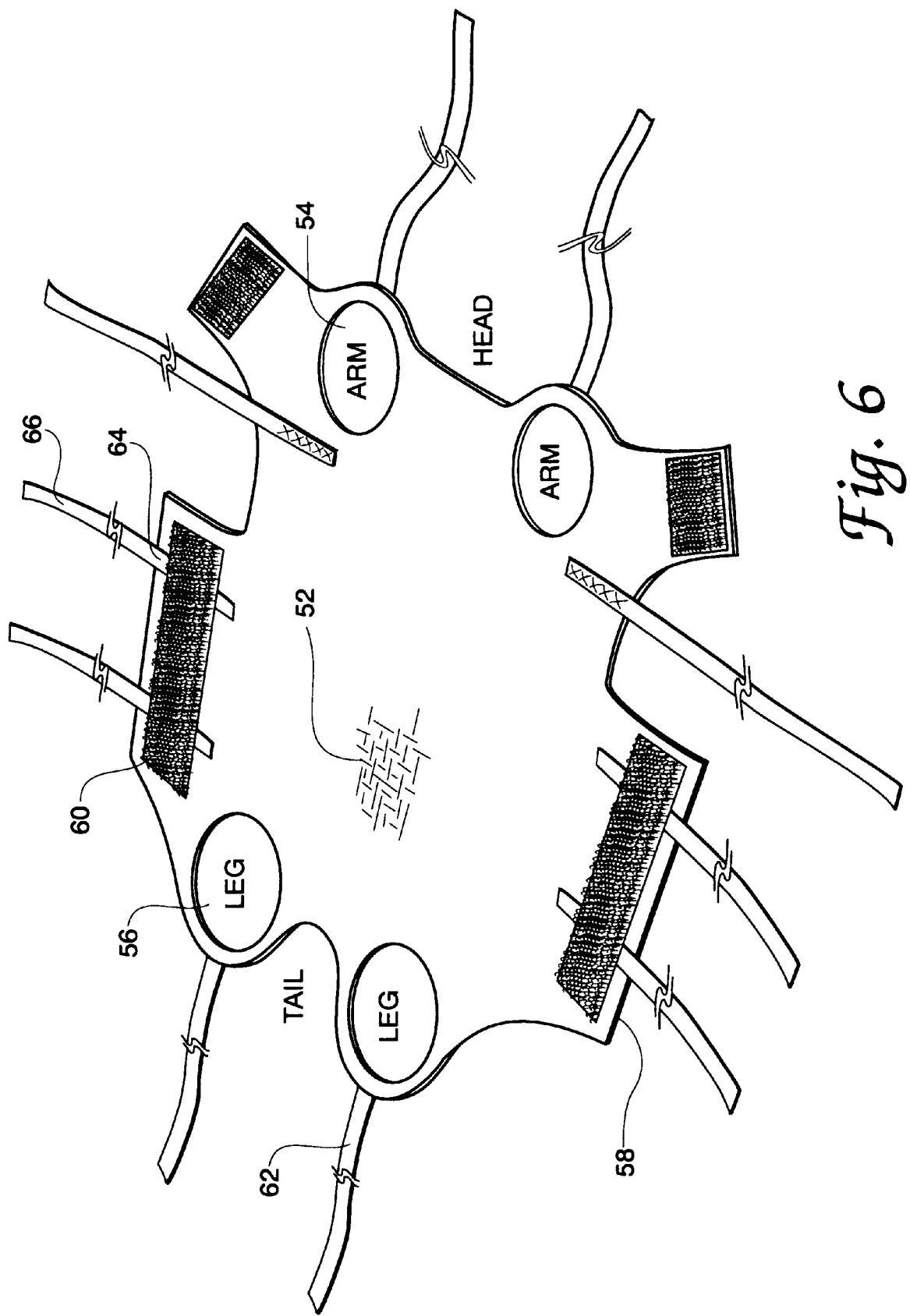
FIG. 6 shows a jacket which is disposed about the body of the animal and secures the animal to the table.

The animal is restrained by means of a jacket 52 illustrated in FIG. 6 which is disposed about the body of the animal. Jacket 52 has arm holes 54 and leg holes 56 through which the arms and legs of the animal can extend. Marginal ends 58 of jacket 52 are secured by means of hook and loop fasteners 60, such as Velcro (TM), so that the jacket 52 fits snugly around the animal's body. Ties 62 are spaced apart from one another around marginal ends 58 of jacket 52. Ties 62 have inner ends 64 securely affixed to jacket 52 and free ends 66 spaced from jacket 52. The animal is restrained by passing ties 62 through spaced apart holes 32 illustrated in FIG. 4b and securing ties 62 to adjustable brackets 34 illustrated in FIG. 1. In addition to supporting the animal, jacket 52 also provides some warmth and comfort.

As illustrated in FIG. 1, the animal, while remaining restrained to table 12, has free range of motion to feed itself from a water and feeding station. Food is available on a forage tray 68 which is placed on bedding 22. Water is contained in a water bottle 70 which is attached to an arm 72 that swings from the side to the center of table 12 allowing the animal to drink as desired. Water bottle 70 and arm 72 are supported by table 12 by means of an accessory pole 74. The bottom portion of accessory pole 74 is attached to frame 16 at upper 24, central 26 and lower 28 members. An adjustable set of brackets 78 located in the upper portion of accessory pole 74 provides support for bottle arm 72 and allows height adjustment. The travel distance of arm 72 is limited by an adjustable cable 82, one end of which is attached to arm 72 and the other to accessory pole 74.

The animal is prevented from accessing chronically-implanted biosensors and instrumentation in the animal's body by means of a biosensor protective shield 84 as illustrated in FIGS. 7a–d. The protective shield 84 is shaped to fit around the front and sides of the animal's body. The protective shield 84 includes cutouts 86 for the head and shoulders of the animal. Protective shield 84 is placed over the animal's body so that the animal's head and arms extend in front of protective shield 84 through cutouts 86. A slide panel 88 is attached to the front of protective shield 84 to allow for height adjustment according to animal size and comfort. As illustrated in FIG. 1, the bottom portion of protective shield 84 rests against bedding 22. The top portion of protective shield 84 is attached to a support arm 94. Support arm 94 is attached by a set of brackets 96 to the top of accessory pole 74.

As illustrated in FIG. 3, when table 12 is in the head-up position, the animal is given upright support by means of a saddle 100 which is attached to table top 14. Saddle 100 is adapted to supportingly engage the back side of the animal and includes an opening for waste drainage and access to a waste collection system.

As illustrated in FIG. 1 and FIG. 2, during horizontal and head-down tilt, animal waste is collected in a waste container tray 112, which can easily be removed and cleaned, and waste output measured. Waste container 112 is supported by frame 16. As illustrated in FIG. 3, during head-up tilt, animal waste is collected in waste container 114 which is attached to the bottom of saddle 100.

As illustrated in FIG. 1, tilting apparatus 10 also includes a pair of front support members 116, a pair of upright support members 117, and a pair of rear support members 118. These support members provide means for supporting table 12 for rotation about first horizontal axis 120, shown in FIG. 1, between a horizontal position and a head-down position, and about a second horizontal axis 122, between a head-down position and a head-up position.

As shown in FIG. 1, front support members 116 consist of a pair of front leg supports 124 and a pair of front foot pads 126. A front leg support 124 is attached to the lower portion of each of the front legs 17. Front foot pads 126 are pivotally attached to front leg supports 124.

Upright support members 117 consist of a pair of upright supports 132 and a pair of upright foot pads 134. As shown in FIG. 8d, upright supports 132 are generally shaped like right triangles. Upright foot pads 134 are pivotally attached to upright supports 132 at first corners 142. An upright support 132 is rotatably attached at a second corner 144 to upper portions of each of the rear legs 18. Upright supports 132 rotate between a retracted positions illustrated in FIG. 2 and FIG. 3, in which upright supports 132 are generally disposed under table top 14, and engaged positions illustrated in FIG. 3, in which side edges 150 extend perpendicular to rear legs 18.

As shown in FIG. 1, rear support members 118 consist a pair of rear leg supports 136, a pair of first rear foot pads 138, and a pair of second rear foot pads 140. As shown in FIG. 8b, rear leg supports 136 are generally shaped like right triangles. First rear foot pads 138 are pivotally attached to rear leg supports 136 at first corners 162. Second rear foot pads 140 are pivotally attached to rear leg supports 136 at second corners 164. A rear leg support 136 is rotatably attached to the lower portions of each of the rear legs 18 at 90 degree corners 168. Rear leg supports 136 rotate between a first position illustrated in FIG. 1, in which short side edges 156 depend from rear legs 18, and a second position illustrated in FIG. 2 and FIG. 3 in which long side edges 158 depend from rear legs 18.

Rear leg supports 136 are locked in position by means of rear support release pins 172 as illustrated in FIG. 8*b*. Pins 172 engage holes 176 in lower portions of rear legs 18 through holes 182 in rear leg supports 136 to lock rear leg supports 136 into the first position. Pins 172 engage holes 176 through holes 184 in rear leg supports 136 to lock rear leg supports 136 into the second position.

Upright supports 132 are locked in position by means of upright support release pins 174 in a similar manner. Pins 174 engage holes 180 in upper portions of rear legs 18 through holes 188 in upright supports 132 to lock upright supports 132 into the retracted position. Pins 174 engage holes 180 through holes 190 in upright supports 132 to lock upright supports 132 into the engaged position.

Rear leg 136 and upright 132 supports have also been machined with slots 194, as illustrated in FIGS. 8*b* and *d*. The slot length is predetermined and allows the supports to swing from one position to the other and back again when release pins 172 and 174 are removed.

Table 12 is shown locked in the horizontal position in FIG. 1. The animal is restrained on table 12. Upright supports 132 are pinned in the retracted position. Rear leg supports 136 are pinned in the first position. In the horizontal position, front foot pads 126 support the front end of frame 16 upon the floor and first rear foot pads 138 support the rear end of frame 16 upon the floor.

Table 12 is shown locked in the head-down position in FIG. 2 Table 12 is quickly and easily tilted from the horizontal to the head-down position by three people. First, rear support release pins 172 are removed. Next, two people stand at the rear of table 12 on opposite sides and lift. The third person rotates rear leg supports 136 down and pins them into the second position. Then table 12 is set back down. In the head-down position, upright supports 132 remain in the retracted position and front leg supports 124 have pivoted on their front foot pads 126. Front foot pads 126 support the front end of frame 16 upon the floor and second rear foot pads 140 support the rear end of frame 16 upon the floor. Returning to the horizontal position is accomplished by reversing this process.

Table 12 is shown in the head-up position in FIG. 3. Starting from the horizontal position, table 12 is quickly and easily tilted to the head-up position by three people. First, saddle 100 is attached to table 12 and the animal is restrained to table 12. Next, tension cable 196 is attached between protective shield support arm 94 and a tension bracket 198 attached to table 12. Upright supports release pins 174 are removed and upright supports 132 are rotated to the engaged position and pinned. Rear support release pins 172 are removed. Two people stand at the rear of table 12 on opposite sides and, while lifting, gently rotate rear leg supports 136 to the second position. Next, two people stand at the front of table 12 on opposite sides and one person stands between them. For the purpose of balance and not weight, they all lift together. Once the table is in the head-up position, rear leg supports 136 are pinned in the second position. In the head-up position, upright foot pads 134 support the upper portion of the rear end of frame 16 upon the floor and second rear foot pads 138 support the lower portion of the rear end upon the floor. Returning to the horizontal position is accomplished by reversing the process.

The teachings of all patents, journal articles and other references cited herein are incorporated herein by reference. It is understood that modifications to the invention may be made as might occur to one with skill in the field of the invention within the scope of the appended claims. All embodiments contemplated thereunder which achieve the objects of the invention have therefore not been shown in complete detail. Other embodiments may be developed without departing from the spirit of the invention or from the scope of the appended claims.

We claim:

1. A tilting apparatus for supporting and restraining a non-human primate animal while conducting long-term research studies, said tilting apparatus comprising:
   (a) a table for supporting said animal while reclining face-down thereon;
   (b) support means for supporting said table for rotation about a horizontal axis, between a horizontal position in which the body of said animal reclining face-down on said table is generally disposed in a horizontal plane and a head-down position in which the head of said animal reclining face-down on said table is tilted below said horizontal plane;
   (c) locking means for releasably locking said table in a selected one of said horizontal and head-down positions of said table; and
   (d) restraining means interconnectable between said table and selected portions of said animal for restraining said animal and supporting it from said table such that said animal has free range of motion of its head and limbs while so restrained.

2. A tilting apparatus according to claim 1 wherein said table includes a frame having opposing front and rear ends and opposing upper and lower portions, a table top on said frame sized to receive said animal in said reclining face-down position forwardly extending toward said front end; and padding to overlie said table top and provide adjustable support to said animal, said padding being contoured to correspond with the body of said animal.

3. A tilting apparatus according to claim 2 wherein said support means includes:
   at least one front support member disposed below said lower portion of said front end for supporting said front end upon the floor when said table is in said horizontal position, at least one rear support member for supporting said rear end upon the floor, said rear member rotatably attached to said lower portion of said rear end for rotation between a first position in which said rear member supports said rear end when said table is in said horizontal position and a second position in which said rear member supports said rear end when said table is in said head-down position, whereby said animal restrained on said table in said horizontal position may be rotated to said head-down position, while still restrained, by picking up said frame at said rear end and rotating said table to said head-down position and rotating said rear support from said first to said second position.

4. A tilting apparatus for supporting and restraining a non-human primate animal while conducting long-term research studies, said tilting apparatus comprising:
   (a) a table for supporting said animal while reclining face-down thereon;
   (b) support means for supporting said table for rotation about a first horizontal axis between a horizontal position in which the body of said animal reclining facedown on said table is generally disposed in a horizontal plane and a head-down position in which the head of said animal reclining face-down on said table is tilted below said horizontal plane and about a second horizontal axis between said head-down position and a head-up position in which the head of said animal reclining face-down on said table is tilted above said horizontal plane;

(c) locking means for releasably locking said table in a selected one of said horizontal, head-down and head-up positions of said table; and (d) restraining means interconnectable between said table and selected portions of said animal for restraining said animal and supporting it from said table such that said animal has free range of motion of its head and limbs while so restrained.

5. A tilting apparatus according to claim 4 wherein said table includes a frame having opposing front and rear ends and opposing upper and lower portions, a table top on said frame sized to receive said animal in said reclining face-down position forwardly extending toward said front end; and padding to overlie said table top and provide adjustable support to said animal, said padding being contoured to correspond with the body of said animal.

6. A tilting apparatus according to claim 5 wherein said support means includes:

at least one front support member disposed below said lower portion of said front end for supporting said front end upon the floor, at least one upright support member rotatably attached to said upper portion of said rear end for rotation between a retracted position in which said upright member is generally disposed under said table top when said table is in said horizontal position or said head-down position and an engaged position in which said upright member supports said upper portion of said rear end upon the floor when said table is in said head-up position, at least one rear support member for supporting said rear end upon the floor, said rear member rotatably attached to said lower portion of said rear end for rotation between a first position in which said rear member supports said rear end when said table is in said horizontal position and a second position in which said rear member supports said rear end when said table is in said head-down position and supports said lower portion of said rear end when said table is in said head-up position, whereby said animal restrained on said table in said horizontal position may be rotated to said head-down position, while still restrained, by picking up said frame at said rear end and rotating said table to said head-down position and rotating said rear support from said first to said second position, and whereby said animal restrained on said table in said head-down position may be rotated to said head-up position, while still restrained, by rotating said upright support from said retracted to said engaged position, picking up said table at said front end and rotating said table to said head-up position.

7. A tilting apparatus as in claims 3 or 6 wherein said lower portion of said frame includes two pairs of legs depending from opposite ends of said frame, said legs having upper and lower portions and wherein said front support member consists of a pair of front leg supports depending from said lower portions of said front legs and a pair of front foot pads pivotally attached to said front leg supports for engaging the floor and supporting said front end upon the floor.

8. A tilting apparatus according to claim 3 wherein said lower portion of said frame includes two pairs of legs depending from opposite ends of said frame, said legs having upper and lower portions and wherein said rear support member consists of a pair of rear leg supports having the general shape of right triangles having short side edges, long side edges and hypotenuse side edges, a pair of first rear foot pads, each said first rear foot pad pivotally attached to a corresponding rear leg support at the corner portion formed by the junction of the short side edge and the hypotenuse side edge, a pair of second rear foot pads, each said second rear foot pad pivotally attached to a corresponding rear leg support at the corner portion formed by the junction of the long side edge and the hypotenuse side edge, each said rear leg support being rotatably attached to the lower portion of a corresponding rear leg at the 90 degree corner for rotation between said first position, in which each said short side edge depends from each said corresponding rear leg such that said first rear foot pads may engage the floor and support said rear end upon the floor when said table is in said horizontal position, and said second position in which each said long side edge depends from each said corresponding rear leg such that said second rear foot pads may engage the floor and support said rear end upon the floor when said table is in said head-down position.

9. A tilting apparatus according to claim 6 wherein said lower portion of said frame includes two pairs of legs depending from opposite ends of said frame, said legs having upper and lower portions and wherein said upright support member consists of a pair of upright supports having the general shape of triangles, a pair of foot pads, each said foot pad pivotally attached to a corresponding upright support at a first corner of said triangle, each said upright support being rotatably attached at a second corner of said triangle to the upper portion of a corresponding rear leg for rotation between said retracted position, in which each said support is generally disposed under said table top, and said engaged position, in which the side edge of each said triangle between said first and second corners extends perpendicularly to each said corresponding rear leg whereby said foot pads engage the floor and support said upper portion of said rear end when said table is in said head-down position, and wherein said rear support member consists of a pair of rear leg supports having the general shape of right triangles having first short side edges, second long side edges and third hypotenuse side edges, a pair of first rear foot pads, each said first rear foot pad pivotally attached to a corresponding rear leg support at the corner portion formed by the junction of the short side edge and the hypotenuse side edge, a pair of second rear foot pads, each said second rear foot pad pivotally attached to a corresponding rear leg support at the corner potion formed by the junction of the long side edge and the hypotenuse side edge, each said rear leg support being rotatably attached to the lower portion of a corresponding rear leg at the 90 degree corner for rotation between said first position, in which each said short side edge depends from each said corresponding rear leg whereby said first rear foot pads engage the floor and support said real end upon the floor when said table is in said horizontal position, and said second position in which each said long side edge depends from each said corresponding rear leg whereby said second rear foot pads engage the floor and support said rear end upon the floor when said table is in said head-down position and support lower portion of said rear end when said table is in said head-up position.

10. A tilting apparatus according to claim 3 wherein said locking means includes at least one rear support release pin for engaging a first hole disposed in said lower portion of said rear end through a corresponding second hole in said rear support member, said first hole being in alignment with said second hole when said table is in said selected position.

11. A tilting apparatus according to claim 6 wherein said locking means includes at least one rear support release pin for engaging a first hole disposed in said lower portion of said rear end through a corresponding second hole in said rear support member, said first hole being in alignment with said second hole when said table is in said selected position and at least one upper support release pin engaging a third hole disposed in said upper portion of said rear end through a corresponding fourth hole in said upper support member, said third hole being in alignment with said fourth hole when said table is in said selected position.

12. A tilting apparatus as in claims 2 or 5 wherein said restraining means includes a jacket disposed about the body of said animal, said jacket having arm holes and leg holes through which the arms and legs of the animal can extend; means for securing marginal ends of said jacket so that the jacket fits snugly around said animal body; ties spaced apart from one another around the marginal ends of the jacket, said ties having inner ends securely affixed to the jacket and free ends spaced from the jacket so that said free ends can be releasably secured to tie down means located in said frame through spaced apart holes in said table top.

13. A tilting apparatus as in claims 1 or 4 wherein said table includes animal waste drain and wherein said table is provided with means to support a waste container whereby animal waste draining through said drain means may be collected in said waste container.

14. A tilting apparatus as in claims 1 or 4 wherein said table is provided with means to support a water and feeding station whereby said animal may drink and eat while restrained to said table.

15. A tilting apparatus according to claim 4 wherein said table includes upright animal support means secured to said table and adapted to supportingly engage the back side of said animal when said table is in said head-up position.

16. A tilting apparatus as in claims 1 or 4 including means to prevent said animal from accessing chronically-implanted biosensors and instrumentation inserted in the body of said animal.

17. A tilting apparatus for supporting and restraining a non-human primate animal while conducting research, said tilting apparatus comprising:
   (a) a table for supporting said animal while reclining face-down thereon, wherein said table includes a frame having opposing front and rear ends and opposing upper and lower portions, a table top on said frame sized to receive said animal in said reclining face-down position forwardly extending toward said front end; and padding to overlie said table top and provide adjustable support to said animal, said padding being contoured to correspond with the body of said animal;
   (b) support means for supporting said table for rotation about a horizontal axis, between a horizontal position in which the body of said animal is generally disposed in a horizontal plane and a head-down position in which the head of said animal is tilted below said horizontal plane, wherein said support means includes at least one front support member disposed below said lower portion of said front end for supporting said front end upon the floor when said table is in said horizontal position, at least one rear support member for supporting said rear end upon the floor, said rear member rotatably attached to said lower portion of said rear end for rotation between a first position in which said rear member supports said rear end when said table is in said horizontal position and a second position in which said rear member supports said rear end when said table is in said head-down position, whereby said animal restrained on said table in said horizontal position may be rotated to said head-down position, while still restrained, by picking up said frame at said rear end and rotating said table to said head-down position and rotating said rear support from said first to said second position;
   (c) locking means for releasably locking said table in a selected one of said horizontal and head-down positions of said table; and
   (d) restraining means interconnectable between said table and selected portions of said animal for restraining said animal and supporting it from said table.

18. A tilting apparatus as in claim 17 wherein said lower portion of said frame includes two pairs of legs depending from opposite ends of said frame, said legs having upper and lower portions and wherein said front support member consists of a pair of front leg supports depending from said lower portions of said front legs and a pair of front foot pads pivotally attached to said front leg supports for engaging the floor and supporting said front end upon the floor.

19. A tilting apparatus according to claim 17 wherein said lower portion of said frame includes two pairs of legs depending from opposite ends of said frame, said legs having upper and lower portions and wherein said rear support member consists of a pair of rear leg supports having the general shape of right triangles having short side edges, long side edges and hypotenuse side edges, a pair of first rear foot pads, each said first rear foot pad pivotally attached to a corresponding rear leg support at the corner portion formed by the junction of the short side edge and the hypotenuse side edge, a pair of second rear foot pads, each said second rear foot pad pivotally attached to a corresponding rear leg support at the corner portion formed by the junction of the long side edge and the hypotenuse side edge, each said rear leg support being rotatably attached to the lower portion of a corresponding rear leg at the 90 degree corner for rotation between said first position, in which each said short side edge depends from each said corresponding rear leg such that said first rear foot pads may engage the floor and support said rear end upon the floor when said table is in said horizontal position, and said second position in which each said long side edge depends from each said corresponding rear leg such that said second rear foot pads may engage the floor and support said rear end upon the floor when said table is in said head-down position.

20. A tilting apparatus according to claim 17 wherein said locking means includes at least one rear support release pin for engaging a first hole disposed in said lower portion of said rear end through a corresponding second hole in said rear support member, said first hole being in alignment with said second hole when said table is in said selected position.

21. A tilting apparatus for supporting and restraining a non-human primate animal while conducting research, said tilting apparatus comprising:
   (a) a table for supporting said animal while reclining face-down thereon, wherein said table includes a frame having opposing front and rear ends and opposing upper and lower portions, a table top on said frame sized to receive said animal in said reclining face-down position forwardly extending toward said front end; and padding to overlie said table top and provide adjustable support to said animal, said padding being contoured to correspond with the body of said animal;
   (b) support means for supporting said table for rotation about a first horizontal axis between a horizontal position in which the body of said animal is generally disposed in a horizontal plane and a head-down position in which the head of said animal is tilted below said horizontal plane and about a second horizontal axis between said head-down position and a head-up position in which the head of said animal is tilted above said horizontal plane, wherein said support means includes at least one front support member disposed below said lower portion of said front end for supporting said front end upon the floor, at least one upright support member rotatably attached to said upper portion of said rear end for rotation between a retracted position in which said upright member is generally disposed under said table top when said table is in said horizontal position or said head-down position and an engaged position in which said upright member supports said upper portion of said rear end upon the floor when said table is in said head-up position, at least one rear support member for supporting said rear end upon the floor, said rear member rotatably attached to said lower portion of said rear end for rotation between a first position in which said rear member supports said rear end when said table is in said horizontal position and a second position in which said rear member supports said rear end when said table is in said head-down position and supports said lower portion of said rear end when said table is in said head-up position, whereby said animal restrained on said table in said horizontal position may be rotated to said head-down position, while still restrained, by picking up said frame at said rear end and rotating said table to said head-down position and rotating said rear support from said first to said second position, and whereby said animal restrained on said table in said head-down position may be rotated to said head-up position, while still restrained, by rotating said upright support from said retracted to said engaged position, picking up said table at said front end and rotating said table to said head-up position;

(c) locking means for releasably locking said table in a selected one of said horizontal, head-down and head-up positions of said table; and (d) restraining means interconnectable between said table and selected portions of said animal for restraining said animal and supporting it from said table.

22. A tilting apparatus as in claim 21 wherein said lower portion of said frame includes two pairs of legs depending from opposite ends of said frame, said legs having upper and lower portions and wherein said front support member consists of a pair of front leg supports depending from said lower portions of said front legs and a pair of front foot pads pivotally attached to said front leg supports for engaging the floor and supporting said front end upon the floor.

23. A tilting apparatus according to claim 21 wherein said lower portion of said frame includes two pairs of legs depending from opposite ends of said frame, said legs having upper and lower portions and wherein said upright support member consists of a pair of upright supports having the general shape of triangles, a pair of foot pads, each said foot pad pivotally attached to a corresponding upright support at a first corner of said triangle, each said upright support being rotatably attached at a second corner of said triangle to the upper portion of a corresponding rear leg for rotation between said retracted position, in which each said support is generally disposed under said table top, and said engaged position, in which the side edge of each said triangle between said first and second corners extends perpendicularly to each said corresponding rear leg whereby said foot pads engage the floor and support said upper portion of said rear end when said table is in said head-down position, and wherein said rear support member consists of a pair of rear leg supports having the general shape of right triangles having first short side edges, second long side edges and third hypotenuse side edges, a pair of first rear foot pads, each said first rear foot pad pivotally attached to a corresponding rear leg support at the corner portion formed by the junction of the short side edge and the hypotenuse side edge, a pair of second rear foot pads, each said second rear foot pad pivotally attached to a corresponding rear leg support at the corner potion formed by the junction of the long side edge and the hypotenuse side edge, each said rear leg support being rotatably attached to the lower portion of a corresponding rear leg at the 90 degree corner for rotation between said first position, in which each said short side edge depends from each said corresponding rear leg whereby said first rear foot pads engage the floor and support said rear end upon the floor when said table is in said horizontal position, and said second position in which each said long side edge depends from each said corresponding rear leg whereby said second rear foot pads engage the floor and support said rear end upon the floor when said table is in said head-down position and support lower portion of said rear end when said table is in said head-up position.

24. A tilting apparatus according to claim 21 wherein said locking means includes at least one rear support release pin for engaging a first hole disposed in said lower portion of said rear end through a corresponding second hole in said rear support member, said first hole being in alignment with said second hole when said table is in said selected position and at least one upper support release pin engaging a third hole disposed in said upper portion of said rear end through a corresponding fourth hole in said upper support member, said third hole being in alignment with said fourth hole when said table is in said selected position.

25. A tilting apparatus for supporting and restraining a non-human primate animal while conducting research, said tilting apparatus comprising:

(a) a table for supporting said animal while reclining face-down thereon, wherein said table includes upright animal support means secured to said table and adapted to supportingly engage the back side of said animal when said table is in said head-up position;

(b) support means for supporting said table for rotation about a first horizontal axis between a horizontal position in which the body of said animal is generally disposed in a horizontal plane and a head-down position in which the head of said animal is tilted below said horizontal plane and about a second horizontal axis between said head-down position and a head-up position in which the head of said animal is tilted above said horizontal plane;

(c) locking means for releasably locking said table in a selected one of said horizontal, head-down and head-up positions of said table; and (d) restraining means interconnectable between said table and selected portions of said animal for restraining said animal and supporting it from said table.

* * * * *